United States Patent
Ando

(10) Patent No.: US 10,064,231 B2
(45) Date of Patent: Aug. 28, 2018

(54) COMMUNICATION APPARATUS

(71) Applicant: Brother Kogyo Kabushiki Kaisha, Nagoya-shi, Aichi-ken (JP)

(72) Inventor: Satoko Ando, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 168 days.

(21) Appl. No.: 15/267,852

(22) Filed: Sep. 16, 2016

(65) Prior Publication Data

US 2017/0086237 A1 Mar. 23, 2017

(30) Foreign Application Priority Data

Sep. 18, 2015 (JP) .................................. 2015-185649

(51) Int. Cl.
*H04W 76/14* (2018.01)
*H04W 8/00* (2009.01)
*H04W 8/18* (2009.01)
*H04W 76/11* (2018.01)
H04W 88/06 (2009.01)

(52) U.S. Cl.
CPC ........... *H04W 76/14* (2018.02); *H04W 8/005* (2013.01); *H04W 8/18* (2013.01); *H04W 76/11* (2018.02); H04W 88/06 (2013.01)

(58) Field of Classification Search
CPC .... G06F 3/1292; G06F 3/1236; G06F 3/1296; H04N 1/00307; H04W 8/005; H04W 76/14; H04W 76/15
See application file for complete search history.

(56) References Cited

U.S. PATENT DOCUMENTS

2013/0260683 A1 10/2013 Suzuki et al.

FOREIGN PATENT DOCUMENTS

JP 2012-129898 A 7/2012

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Jung Park
(74) *Attorney, Agent, or Firm* — Banner & Witcoff, Ltd.

(57) ABSTRACT

A communication apparatus may establish a first wireless connection with a terminal apparatus by using first wireless information under a state where the communication apparatus operates in the first operation mode, and receive setting information by using the first wireless connection so as to store the setting information in a setting area. The communication apparatus may establish a second wireless connection with the terminal apparatus by using second wireless information under a state where the communication apparatus operates in a second operation mode, store the second wireless information in a connection history area, and re-establish the second wireless connection with the terminal apparatus by using the second wireless information stored in the connection history area under a state where the communication apparatus operates in the second operation mode after the second wireless connection has been disconnected.

14 Claims, 10 Drawing Sheets

(Case C; Continuation of Case A or Case B)

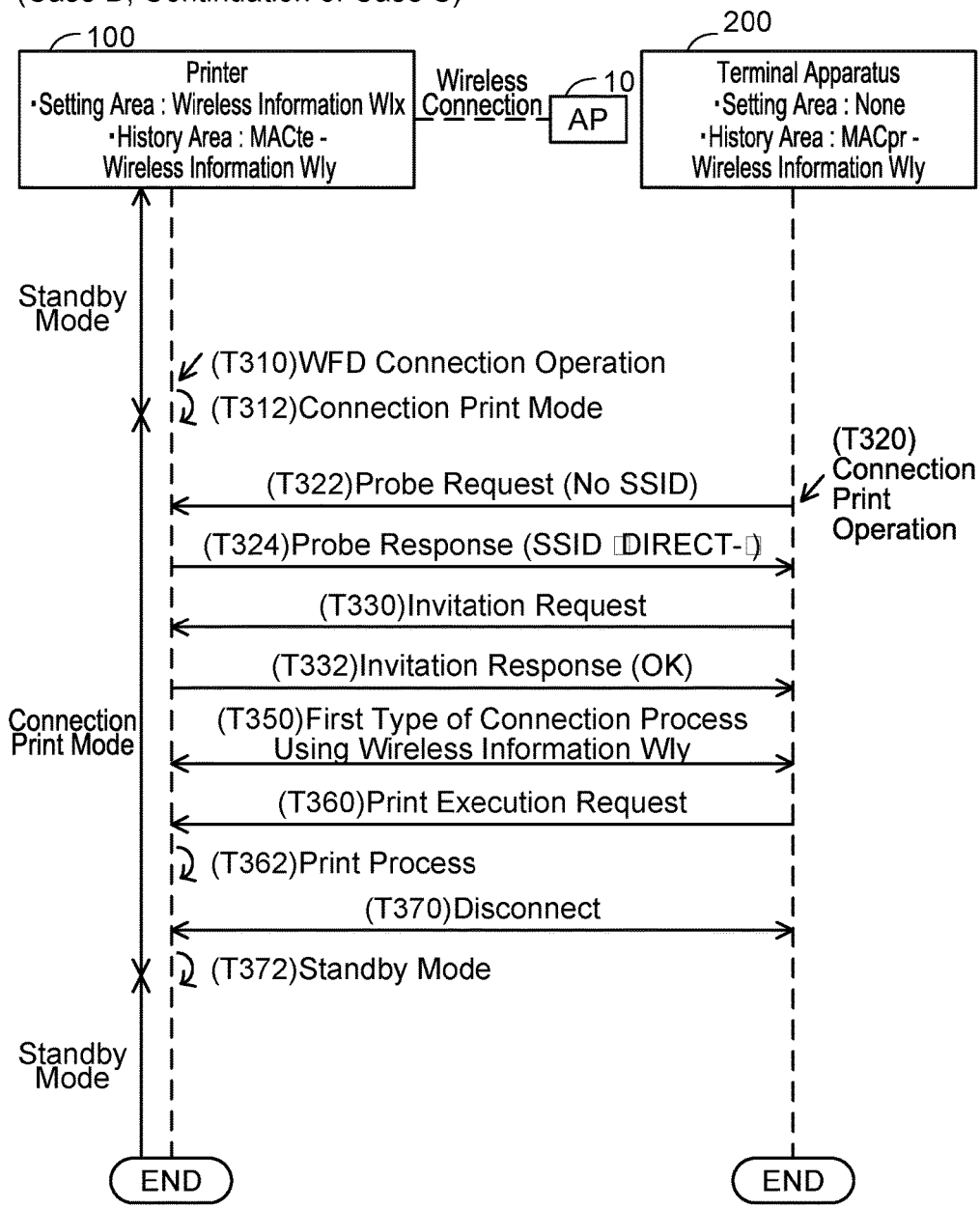

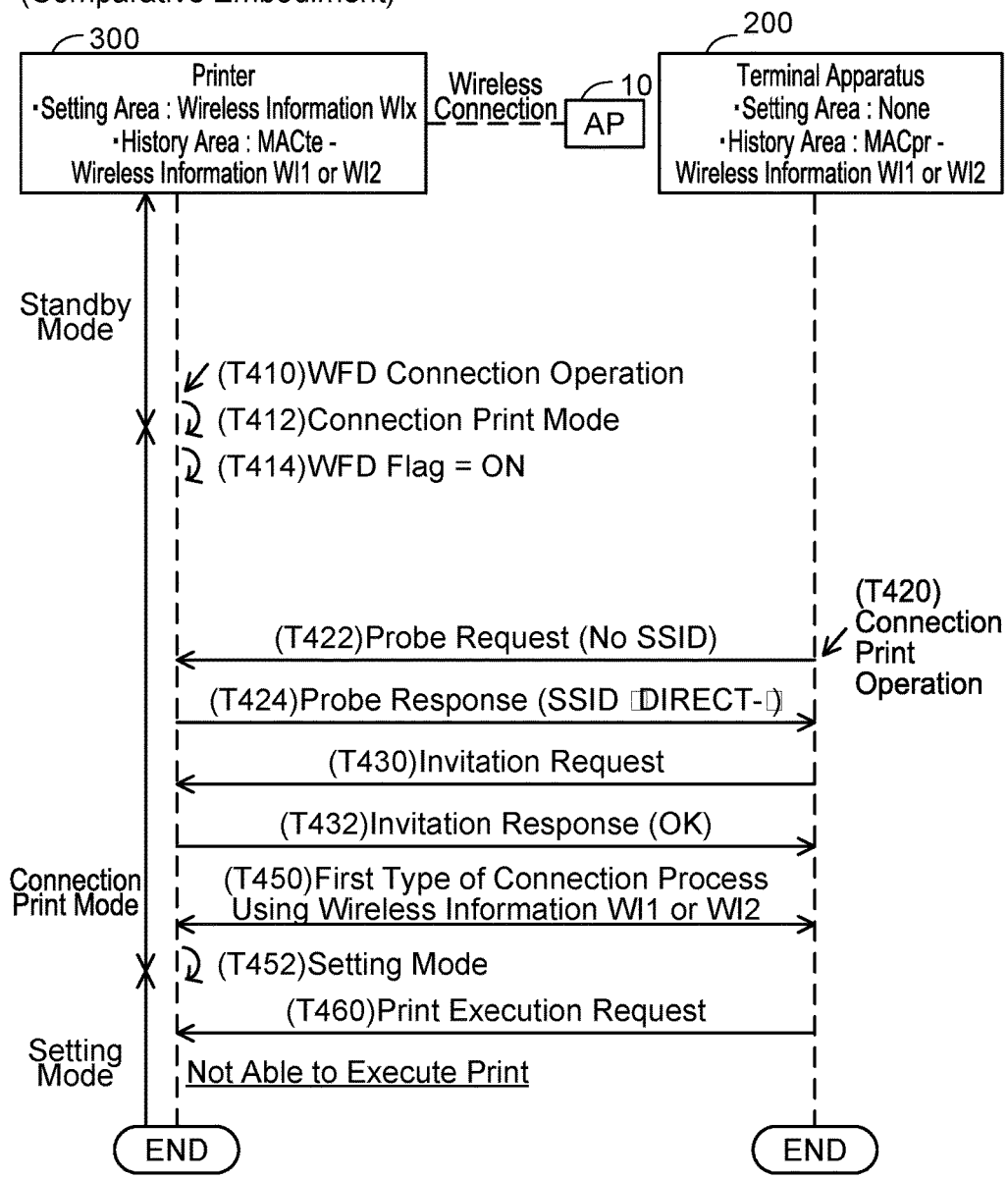

ion No. 2015-185649, filed on Sep. 18, 2015, the entire contents of which are hereby incorporated by reference into the present application.

COMMUNICATION APPARATUS

CROSS-REFERENCE TO RELATED APPLICATION

This application claims priority to Japanese Patent Application No. 2015-185649, filed on Sep. 18, 2015, the entire contents of which are hereby incorporated by reference into the present application.

TECHNICAL FIELD

The present disclosure relates to a communication apparatus which stores wireless information for establishing a wireless connection and which, after the wireless connection has been disconnected, is capable of re-establishing the wireless connection by using the stored wireless information.

BACKGROUND ART

For example, a so-called Persistent function is used in Wi-Fi Direct (registered trademark; called "WFD scheme" below), which is a wireless communication scheme developed by the Wi-Fi Alliance. The Persistent function is a function which, in a case where a communication apparatus has established a wireless connection with another communication apparatus in accordance with the WFD scheme by using wireless information, stores that wireless information. Since the wireless information is stored, after the wireless connection has been disconnected, the communication apparatus can re-establish the wireless connection by using the stored wireless information.

SUMMARY

When a configuration in which the communication apparatus, in a case where a wireless connection has been established using wireless information, constantly stores the wireless information is implemented, there is a possibility that the communication apparatus cannot operate properly in accordance with an operation mode. The present disclosure provides a technique which may allow a communication apparatus to operate properly in accordance with an operation mode.

A communication apparatus may comprise a wireless interface, a processor and a memory comprising a setting area for storing setting information which is to be used by the communication apparatus and a connection history area for storing wireless information for establishing a wireless connection in a case where the wireless connection via the wireless interface is established, wherein the memory may store computer-readable instructions therein, and the computer-readable instructions, when executed by the processor, may cause the communication apparatus to execute: causing the communication apparatus to operate in one of a plurality of operation modes including a first operation mode and a second operation mode different from the first operation mode, the first operation mode being for receiving the setting information which is to be used by the communication apparatus from a terminal apparatus so as to store the setting information in the setting area; establishing a first wireless connection with the terminal apparatus via the wireless interface by using first wireless information under a state where the communication apparatus operates in the first operation mode; receiving the setting information by using the first wireless connection so as to store the setting information in the setting area, in a case where the first wireless connection is established; establishing a second wireless connection with the terminal apparatus via the wireless interface by using second wireless information different from the first wireless information under a state where the communication apparatus operates in the second operation mode; storing the second wireless information in the connection history area in a case where the second wireless connection is established, wherein the first wireless information is not stored in the connection history area even when the first wireless connection is established; and re-establishing the second wireless connection with the terminal apparatus by using the second wireless information stored in the connection history area in a case where a wireless connection with the terminal apparatus via the wireless interface is to be re-established under a state where the communication apparatus operates in the second operation mode after the second wireless connection has been disconnected.

A control method and computer-readable instructions for implementation of the communication apparatus described above, and a non-transitory computer-readable recording medium in which the computer-readable instructions are stored, are also novel and useful. Moreover, a communication system comprising the communication apparatus described above and specific external apparatus is also novel and useful.

BRIEF DESCRIPTION OF THE DRAWINGS

FIG. 2 shows a flowchart of a process at a time when power is turned ON;
FIG. 6 shows a sequence diagram of a case A when power is turned ON;
FIG. 9 shows a sequence diagram of a case D in which printing is executed after re-establishment of the wireless connection;
and
FIG. 10 shows a sequence diagram of a comparative example.

Figure 1:
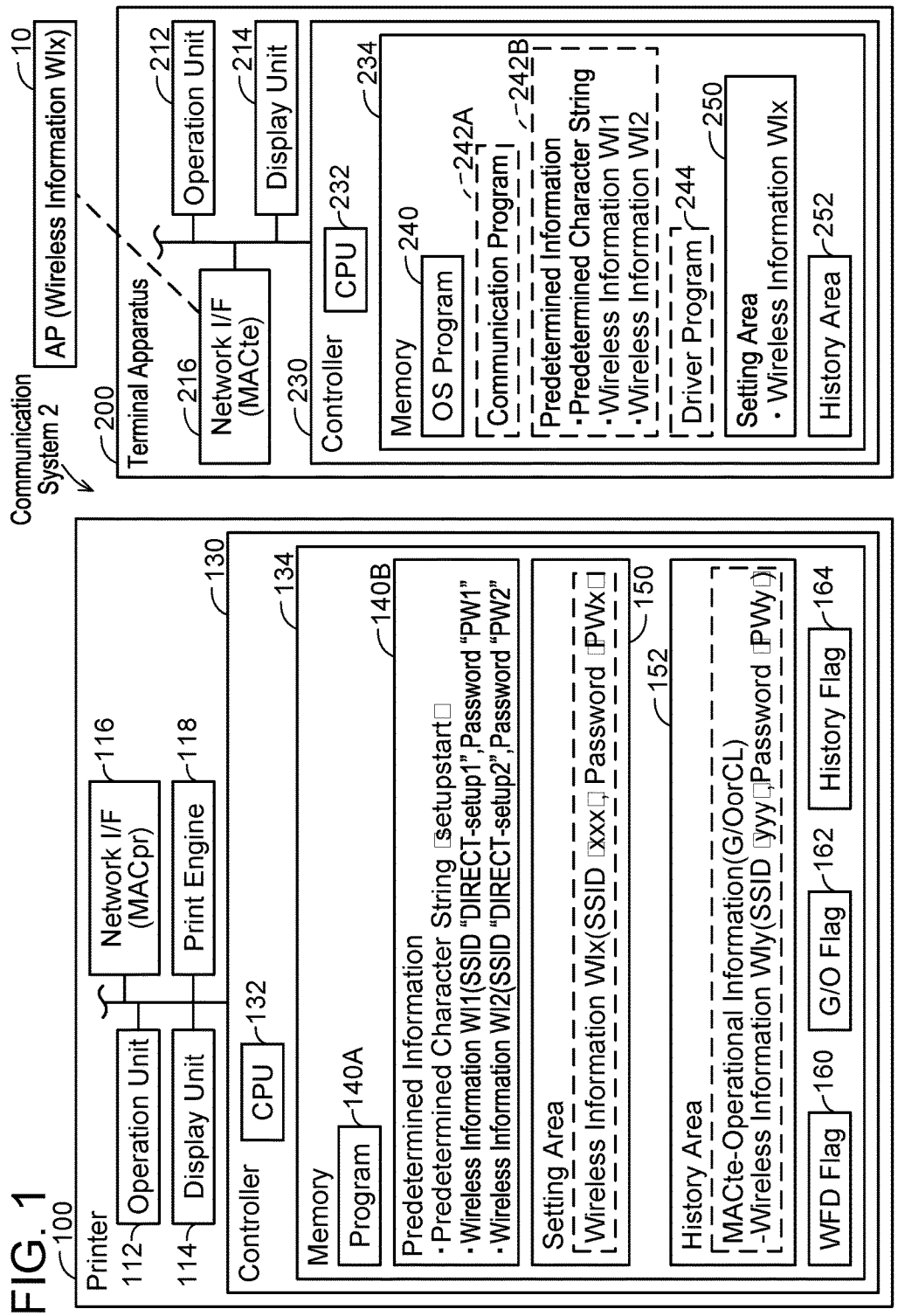
FIG. 1 shows a configuration of a communication system.

EMBODIMENT (Configuration of Communication System 2)
As shown in FIG. 1, a communication system 2 comprises a printer 100 and a terminal apparatus 200. The printer 100 is capable of establishing a wireless connection in accordance with the WFD scheme (called "WFD connection" below) with the terminal apparatus 200, and forming a wireless network to which the printer 100 and the terminal apparatus 200 belong. The terminal apparatus 200 has established a wireless connection with an AP (abbreviation of Access Point) 10, and is participating in the wireless network formed by the AP 10. It should be noted that a network may be described as "NW" below.

(Configuration of Printer 100)
The printer 100 comprises an operation unit 112, a display unit 114, a network interface (called "network I/F" below) 116, a print engine 118, and a controller 130. The operation unit 112 comprises a plurality of keys, and accepts operations of a user. The display unit 114 is a display for displaying various information, and also functions as a so-called touch panel. That is, the display unit 114 also functions as an operation unit. Below, the reference numbers 112 and 114 will be omitted at locations where the operation units of the printer 100 are described, and the operation units of the printer 100 will be referred to simply as "operation units." The print engine 118 comprises a printing mechanism such as an ink jet scheme, laser scheme, etc.

The network I/F 116 is an I/F for executing a wireless communication in accordance with Wi-Fi scheme, and is assigned a MACpr, which is a MAC address being an identifier for identifying the I/F. The Wi-Fi scheme is a wireless communication scheme conforming to the standards developed by the Wi-Fi Alliance, and is a wireless communication scheme based on, for example, IEEE (abbreviation of The Institute of Electrical and Electronics Engineers, Inc.) standard 802.11 and standards conforming thereto (e.g., 802.11a, 11b, 11g, 11n, etc.). In particular, the network I/F 116 supports the WFD scheme. Details of the WFD scheme are described in "Wi-Fi Peer-to-Peer(P2P) Technical Specification Version1.1" created by the Wi-Fi Alliance. Further, details of the WFD scheme are also disclosed in US Patent Application Publication No. 2013/0260683, which is incorporated by reference into the present application.

The controller 130 comprises a CPU 132 and a memory 134. The memory 134 is configured by a ROM, RAM, etc., and has stored a program 140A and predetermined information 140B in advance before the printer 100 was shipped. The CPU 132 executes various processes in accordance with the program 140A. The predetermined information 140B is information which is referred to by the CPU 132 during execution of the program 140A, and includes a predetermined character string "setupstart," wireless information WI1, and wireless information WI2. The predetermined character string "setupstart" is a character string used for determining whether the printer 100 is to operate as a Group Owner (called "G/O" below) of the WFD scheme under a state where the printer 100 is operating in an after-mentioned setting mode.

The wireless information WI1 is information used for establishing a WFD connection with the terminal apparatus 200 and forming a wireless NW under a state where the printer 100 is operating in the setting mode when power is initially turned ON, and includes an SSID (abbreviation of Service Set Identifier) "DIRECT-setup1" and a password "PW1." The aforementioned time when power is initially turned ON includes the power being turned on for the first time after the shipping of the printer 100, and the power being turned on for the first time after an initialization of the printer 100. The SSID is an identifier for identifying the wireless NW. In particular, an SSID including the character string "DIRECT-" is an identifier for identifying a wireless NW formed by the G/O, i.e., a wireless NW in accordance with the WFD scheme. That is, a wireless connection in which the SSID including the character string "DIRECT-" is used can be said to be a WFD connection in accordance with the WFD scheme. The password is a character string used for authentication and encryption in the wireless NW.

The wireless information WI2 is information used for establishing a WFD connection with the terminal apparatus 200 and forming a wireless NW under a state where the printer 100 is operating in the setting mode at a time of after-mentioned setting operation, and includes an SSID "DIRECT-setup2" and a password "PW2." In the present embodiment, the SSID and password in the wireless information WI2 are different from the SSID and password in the wireless information WI1, respectively. However, in a modification, the former SSID and password may be the same as the latter SSID and password respectively.

As described above, since the predetermined information 140B has been stored in advance in the memory 134 before the printer 100 was shipped, the wireless information WI1 and WI2 can be said to be information which has been stored in advance in the memory 134 before the printer 100 starts to operate in the setting mode, more specifically, before a communication for establishing a WFD connection using that information is started. It should be noted that, in a modification, the wireless information WI1 and WI2 may be installed in the memory 134 from, for example, a server on the Internet, after the shipping of the printer 100 and before the printer 100 starts to operate in the setting mode. Further, in another modification, the wireless information WI1 and WI2 may be information which is stored in the memory 134 after the printer 100 has started to operate in the setting mode (e.g., information generated by a G/O determined by G/O Negotiation).

The memory 134 further comprises a setting area 150 and a history area 152. Wireless information may be stored in each of the areas 150 and 152. However, at the shipment stage of the printer 100, wireless information is not stored in the areas 150 and 152, and this is represented by a dashed line in the areas 150 and 152 of FIG. 1. The setting area 150 is an area for storing wireless information WIx for establishing a wireless connection with the AP 10. Specifically, in a case where the wireless information WIx is received from the terminal apparatus 200, the wireless information WIx is stored in the setting area 150. The wireless information WIx is information used in a wireless NW formed by the AP 10, and includes an SSID "xxx" and a password "PWx."

The history area 152 is an area for realizing the so-called Persistent function of the WFD scheme. Wireless information WIy for establishing a WFD connection is stored in the history area 152. Specifically, in a case where a WFD connection with the terminal apparatus 200 is established under a state where the printer 100 is operating in a connection print mode, the wireless information WIy for establishing the WFD connection is stored in the history area 152. The wireless information WIy is information generated by the G/O after execution of the G/O Negotiation, and includes an SSID "yyy" and a password "PWy." That is, the wireless information WIy can be said to be information which is stored in the memory 134 after the printer 100 has started to operate in the connection print mode, more specifically, after communication for establishing a WFD connection has started. However, in a modification, the wireless information WIy may be generated by the printer 100 and stored in the memory 134 after the printer 100 has started to operate in the connection print mode, and before the aforementioned communication is started. Further, in another modification, for example, the wireless information WIy may be stored in advance in the memory 134 as a part of the predetermined information 140B before the shipping of the printer 100. That is, the wireless information WIy may be stored in advance in the memory 134 before the printer 100 starts to operate in the connection print mode (i.e., before the communication for establishing a WFD connection is started). Further, a MACte which is a MAC address of the terminal apparatus 200 and operation information are stored in association with the wireless information WIy in the history area 152. The operation information is information indicating whether the printer 100 operated as a G/O or operated as a Client (called "CL" below) of the WFD scheme.

The memory 134 further comprises a WFD flag 160, a G/O flag 162, and a history flag 164. The WFD flag 160 is set to either one of two values: "ON" meaning that the printer 100 is operating in accordance with the WFD scheme, and "OFF" meaning that the printer 100 isnot operating. The G/O flag 162 is set to either one of two values: "ON" meaning that the printer 100 is operating autonomously as a G/O without executing a G/O Negotiation, and "OFF" meaning that the printer 100 is not operating. The history flag 164 is set to either one of two values: "ON" meaning that wireless information is stored in the history area 152, and "OFF" meaning that the wireless information is not stored.

(Configuration of Terminal Apparatus 200)

The terminal apparatus 200 may be a stationary apparatus such as a desktop PC, or the like, or may be a portable apparatus such as a notebook PC, a tablet PC, a smartphone, etc. The terminal apparatus 200 comprises an operation unit 212, a display unit 214, a network I/F 216, and a controller 230. The operation unit 212 comprises a keyboard and a mouse, and accepts operations of the user. The display unit 214 is a display for displaying various information. The network I/F 216, as with the network I/F 116, supports the WFD scheme. The MACte, which is different from the MACpr, is assigned to the network I/F 216.

The controller 230 comprises a CPU 232 and a memory 234. The CPU 232 executes various processes in accordance with an OS (abbreviation of Operating System) program 240 which is stored in the memory 234. The memory 234 is configured by a ROM, RAM, etc.

The memory 234 can further store a communication program 242A, predetermined information 242B, and a driver program 244. Each of data 242A, 242B, and 244 is installed on the terminal apparatus 200 from a server (not shown) on the Internet provided by a vendor of the printer 100. In a modification, each of the data 242A, etc. may be installed on the terminal apparatus 200 from a media shipped together with the printer 100.

The communication program 242A is a program for sending the wireless information WIx of the AP 10 to the printer 100. The predetermined information 242B is information which is referred to by the CPU 232 during execution of the communication program 242A, and includes the same information as the predetermined information 140B which is stored in the printer 100 (i.e., the predetermined character string, the wireless information WI1 and WI2). The driver program 244 is a program for sending a print execution request to the printer 100.

The memory 234 further comprises a setting area 250 and history area 252 as the printer 100 comprises the setting area 150 and the history area 152. In a state of FIG. 1, since the terminal apparatus 200 has established a wireless connection with the AP 10, the wireless information WIx of the AP 10 is being stored in the setting area 250. The wireless information WIy can be stored in the history area 252.

(Configuration of AP 10)

The AP 10 is a known AP called a wireless AP, wireless LAN router, or the like. The AP 10 forms a wireless NW by using, for example, the wireless information WIx determined by the user. The AP 10 establishes a wireless connection with the terminal apparatus 200 in accordance with, for example, a so-called automatic wireless setting of WPS (Wi-Fi Protected Setup) or the like, or a manual wireless setting. As a result, the wireless information WIx of the AP 10 is stored in the setting area 250 of the terminal apparatus 200.

Figure 2:
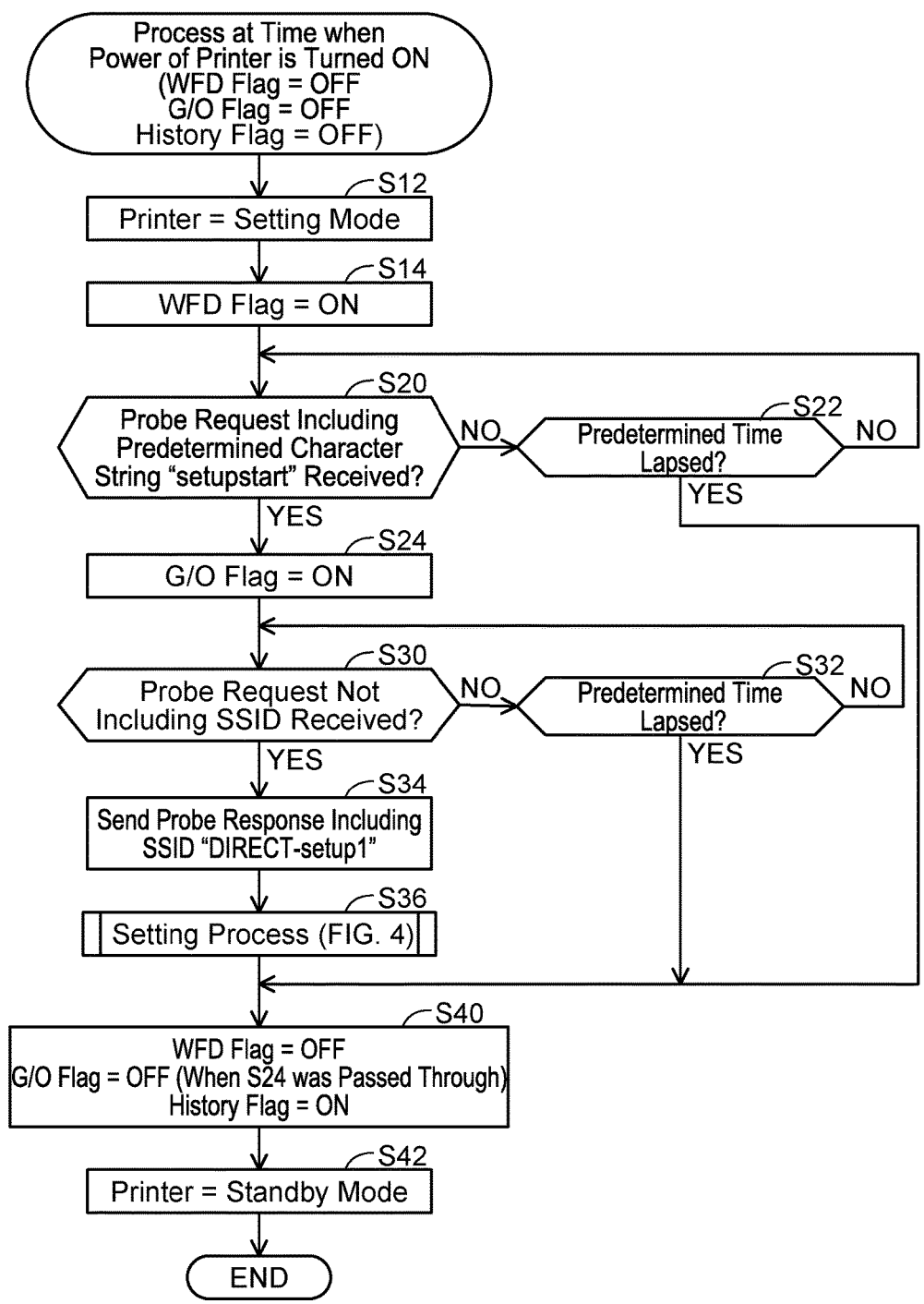

(Process at Time when Power of Printer 100 is Turned ON; FIG. 2)

Next, contents of processing executed at a time when power of the printer 100 is initially turned ON will be described with reference to FIG. 2. At a stage where the process of FIG. 2 is started, each of the flags 160, 162, and 164 in the printer 100 is set to OFF. It should be noted that the following communications and connections executed by the printer 100 and the terminal apparatus 200 are communications and connections via the network I/Fs 116 and 216. Therefore, the description "via the network I/F 116 (or 216)" will be omitted below.

In S12, the CPU 132 causes the printer 100 to operate in the setting mode. The setting mode is an operation mode for receiving the wireless information WIx of the AP 10 from the terminal apparatus 200, and storing the information WIx in the setting area 150. In S14, the CPU 132 changes the WFD flag 160 to ON. Thereby, the printer 100 reaches a state of being able to execute communications in accordance with the WFD scheme (e.g., S20 and S34 of FIG. 2, etc.). On the other hand, the CPU 132 maintains the other flags 162 and 164 in OFF. Since the history flag 164 is maintained in OFF, wireless information is not stored in the history area 152 under a state where the printer 100 is operating in the setting mode.

Next, in S20, the CPU 132 monitors whether a predetermined probe request is received from the terminal apparatus 200. The probe request is a signal for searching for a connection target of a wireless connection, and includes a description area for describing the SSID of the wireless NW formed by the connection target. That is, a probe request in which an SSID is described in the description area is a signal for searching for an apparatus which is forming the wireless NW (i.e., an apparatus operating as a parent station of a wireless NW) identified by the SSID. On the other hand, a probe request in which an SSID is not described in the description area is a signal for searching for any apparatus capable of receiving the request. The predetermined probe request monitored in S20 is a signal in which the predetermined character string "setupstart" is described in the description area. However, since the printer 100 is not operating as a parent station of the wireless NW at the stage of S20, the predetermined probe request is not a signal for searching for the printer 100 operating as the parent station of the wireless NW, but is a signal having a role of trigger for causing the printer 100 to operate as the G/O (i.e., parent station). In a case where a probe request is received from an external, and a character string described in the description area in the request is identical with the character string "setupstart" in the predetermined information 140B, the CPU 132 determines YES in S20, and proceeds to S24. It should be noted that, in this case, the CPU 132 does not send a probe response to the predetermined probe request to the terminal apparatus 200 but, in a modification, the CPU 132 may send the response.

Simultaneously with the monitoring of S20, in S22, the CPU 132 monitors whether a predetermined period of time has lapsed since the power of the printer 100 was initially turned ON. When the predetermined period of time has lapsed without receiving the predetermined probe request (NO in S20), the CPU 132 determines YES in S22, skips S24 to S36, and proceeds to S40.

In S24, the CPU 132 changes the G/O flag 162 to ON, causing the printer 100 to operate as G/O. As a result, a wireless NW is formed in which the wireless information WI1 in the predetermined information 140B is used (called "first NW" below). At this stage, only the printer 100 belongs to the first NW. When S24 ends, the process proceeds to S30.

In S30, the CPU 132 monitors whether a probe request in which an SSID is not described in the description area (called "probe request not including an SSID" below) is received from the terminal apparatus 200. In a case where a probe request not including an SSID has been received, the CPU 132 determines YES in S30, and proceeds to S34.

Simultaneously with the monitoring of S30, in S32, the CPU 132 monitors whether a predetermined period of time has lapsed since the process of S24 ended. When the predetermined period of time has lapsed without receiving a probe request not including an SSID (NO in S30), the CPU 132 determines YES in S32, skips S34 and S36, and proceeds to S40.

In S34, the CPU 132 sends to the terminal apparatus 200 a probe response including the SSID "DIRECT-setup1" in the wireless information WI1 which is used in the first NW. Then, in S36, the CPU 132 executes a setting process (see after-mentioned FIG. 4). The setting process includes establishing a WFD connection with the terminal apparatus 200 by using the wireless information WI1, and causing the terminal apparatus 200 to participate in the first NW. The setting process further includes receiving the wireless information WIx of the AP 10 from the terminal apparatus 200, and storing the information WIx in the setting area 150. When S36 ends, the process proceeds to S40.

In S40, the CPU 132 changes the WFD flag 160 to OFF. Thereby, the printer 100 reaches a state of being unable to execute communications in accordance with the WFD scheme, for example, even if receiving a probe request, the CPU 132 does not send a probe response. Further, in a case where S24 is executed, the CPU 132 changes the G/O flag 162 to OFF. Thereby, the first NW formed in S24 disappears. The CPU 132, further, changes the history flag 164 to ON. Thereby, thereafter, in a case where a WFD connection with the terminal apparatus 200 is established under a state where the printer 100 is operating in a mode different from the setting mode, wireless information for establishing the WFD connection is stored in the history area 152.

Figure 3:
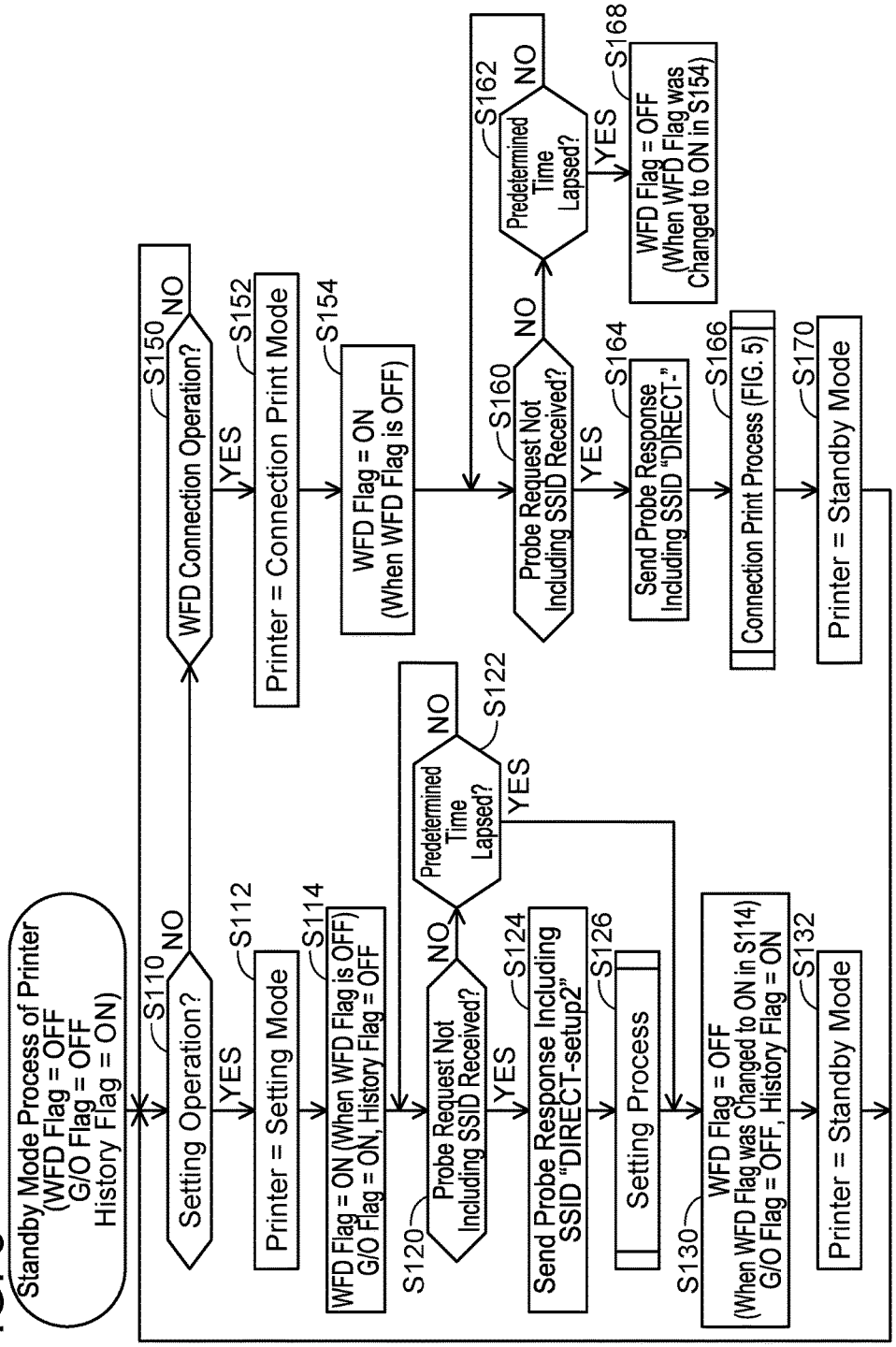
FIG. 3 shows a flowchart of a standby mode process.

Next, in S42, the CPU 132 causes the printer 100 to operate in a standby mode. The standby mode is a mode of waiting until accepting an instruction from the user. When S42 ends, a standby mode process of FIG. 3, which will be described next, is executed. Further, when the power is turned ON second and subsequent times after the initial time of turning the power ON, the standby mode process of FIG. 3 is executed without executing the process of FIG. 2. It should be noted that, in a modification, the process of FIG. 2 may be executed not only when the power is initially turned ON, but also when the power is turned ON second and subsequent times.

(Standby Mode Process of Printer 100; FIG. 3)

Next, contents of the standby mode process will be described with reference to FIG. 3. At a stage where the process of FIG. 3 is started, the history flag 164 is set to ON, and the WFD flag 160 and the G/O flag 162 are set to OFF (see S40 of FIG. 2).

In S110, the CPU 132 monitors whether the operation unit accepts a setting operation for causing the printer 100 to operate in the setting mode. In a case where the operation is accepted, i.e., in a case where an instruction for causing the printer 100 to operate in the setting mode is given by the user, the CPU 132 determines YES in S110, and proceeds to S112.

In S112, the CPU 132 causes the printer 100 to operate in the setting mode. Then, in S114, the CPU 132 changes the WFD flag 160 to ON. It should be noted that, if S164 and S166 are executed after the WFD flag 160 is changed to ON in after-mentioned S154, the WFD flag 160 is maintained in ON as long as an operation for changing the WFD flag 160 to OFF is not executed by the user thereafter. Consequently, there is a possibility that the WFD flag 160 is ON at the time when S114 is started. In this case, the CPU 132 maintains the WFD flag 160 ON without changing the WFD flag 160. Further, the CPU 132 changes the G/O flag 162 to ON, causing the printer 100 to operate as G/O. As a result, a wireless NW is formed in which the wireless information WI2 is used (called "second NW" below). At this stage, only the printer 100 belongs to the second NW. Further, the CPU 132 changes the history flag 164 to OFF. As a result, under the state where the printer 100 is operating in the setting mode, wireless information is not stored in the history area 152. When S114 ends, the process proceeds to S120.

S120 and S122 are the same as S30 and S32 of FIG. 2. The process proceeds to S124 in the case of YES in S120, and in the case of YES in S122, the process skips S124 and S126, and proceeds to S130. S124 and S126 are the same as S34 and S36 of FIG. 2 except for a point that the wireless information WI2 is used. When S126 ends, the process proceeds to S130. S130 and S132 are the same as S40 and S42 of FIG. 2. However, in S130, the CPU 132 changes the WFD flag 160 to OFF in a case where the WFD flag 160 was changed to ON in S114, but the CPU 132 maintains the WFD flag 160 in ON without changing the WFD flag 160 to OFF in a case where the WFD flag 160 was already ON in S114. That is, the CPU 132 returns the WFD flag 160 to the state at the time of executing the operation of S110. When S132 ends, the process returns to S110.

Simultaneously with the monitoring of S110, in S150, the CPU 132 monitors whether the operation unit accepts a WFD connection operation for causing the printer 100 to operate in the connection print mode. In a case where the operation is accepted, i.e., in a case where an instruction for causing the printer 100 to operate in the connection print mode is given by the user, the CPU 132 determines YES in S150, and proceeds to S152.

In S152, the CPU 132 causes the printer 100 to operate in the connection print mode. The connection print mode is an operation mode for establishing a WFD connection with the terminal apparatus 200, and executing a print process in accordance with a print execution request from the terminal apparatus 200. In a case where the WFD flag 160 is OFF, in S154 the CPU 132 changes the WFD flag 160 to ON. Here, the CPU 132 maintains the G/O flag 162 in OFF, and maintains the history flag 164 in ON. Since the history flag 164 is maintained in ON, wireless information is stored in the history area 152 in a case where a WFD connection with the terminal apparatus 200 has been established. When S154 ends, the process proceeds to S160.

S160 and S162 are the same as S120 and S122. In the case of YES in S160, the process proceeds to S164, and in the case of YES in S162, the process proceeds to S168. In S164, the CPU 132 sends a probe response including the SSID "DIRECT-" to the terminal apparatus 200. Then, in S166, the CPU 132 executes a connection print process (see after-mentioned FIG. 5). The connection print process includes establishing a WFD connection with the terminal apparatus 200, and executing a print process in accordance with a print execution request from the terminal apparatus 200. When S166 ends, the process proceeds to S170. S170 is the same as S132. When S170 ends, the process returns to S110.

In S168, the CPU 132 changes the WFD flag 160 to OFF in a case where the WFD flag 160 was changed to ON in S154, but the CPU 132 maintains the WFD flag 160 in ON without changing the WFD flag 160 to OFF in a case where the WFD flag 160 was already ON in S154. That is, the CPU 132 returns the WFD flag 160 to the state at the time of executing the operation of S150. When S168 ends, the process returns to S110 via S170.

Figure 4:
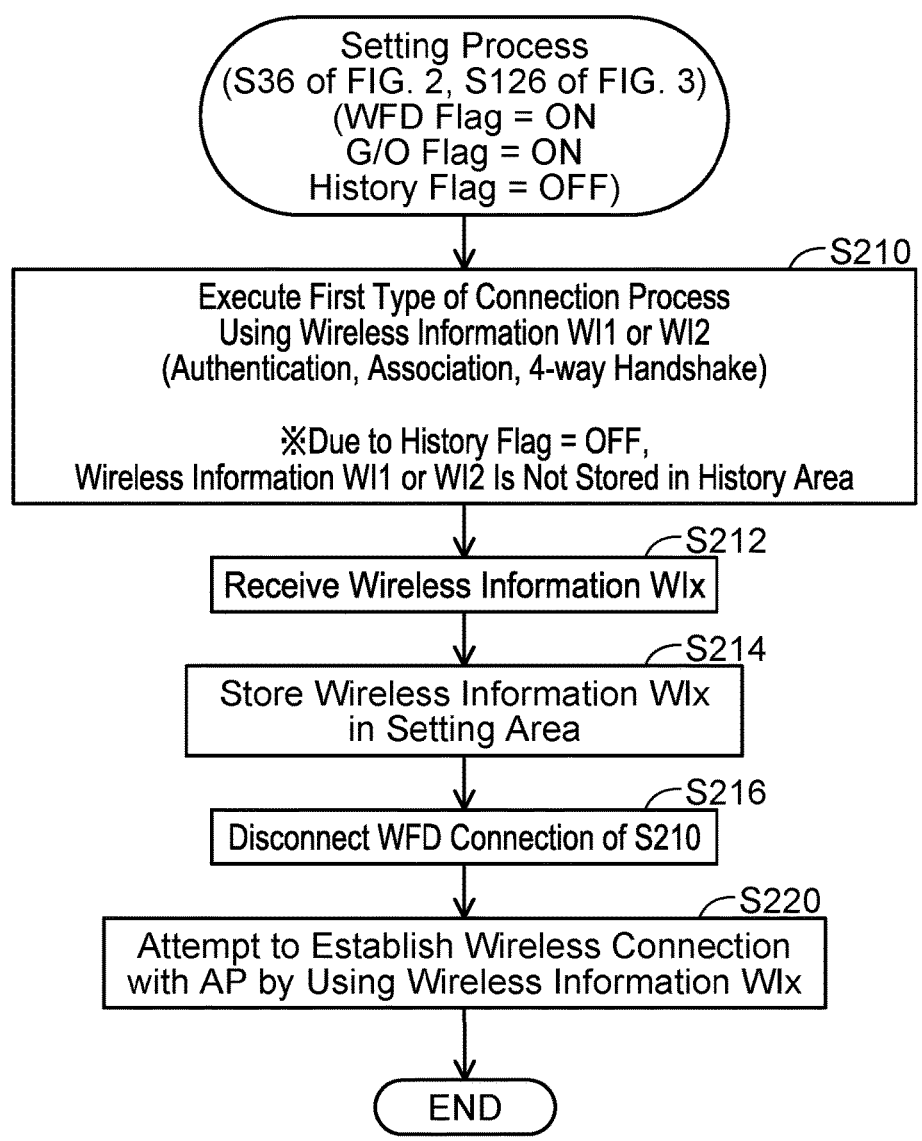
FIG. 4 shows a flowchart of a setting process.

(Setting Process; FIG. 4)

Next, contents of the setting process executed in S36 of FIGS. 2 and S126 of FIG. 3 will be described with reference to FIG. 4. At a stage where the process of FIG. 4 is started, the WFD flag 160 and the G/O flag 162 are set to ON, and the history flag 164 is set to OFF (see S14 and S24 of FIG. 2, S114 of FIG. 3).

In S210, the CPU 132 executes a first type of connection process for establishing a WFD connection with the terminal apparatus 200. Specifically, in S210 which is in the setting process of S36 of FIG. 2, the CPU 132 executes the first type of connection process using the wireless information WI1 of the first NW formed in S24 of FIG. 2. From a view of a G/O apparatus which is to operate as G/O (here, the printer 100), the first type of connection process includes reception of an Authentication request, sending of a response thereto, reception of an Association request, sending of a response thereto, and communication of a 4-way handshake. Both the printer 100 and the terminal apparatus 200 store the wireless information WI1 in advance before the communication of S210 is started, and are capable of executing the first type of connection process by using the wireless information WI1. Therefore, the first type of connection process does not include a communication (i.e., WSC Exchange) for sending the wireless information WI1 from the G/O apparatus to a child station apparatus which is to operate as a child station (here, the terminal apparatus 200). It should be noted that the child station may be a CL of the WFD scheme, or may be a so-called legacy. During a course of communication of each signal, the G/O apparatus receives wireless information from the child station apparatus, executes authentication of the wireless information (i.e., authentication of the child station apparatus) and, in a case where the authentication succeeds, establishes a wireless connection with the child station apparatus. Here, the CPU 132 receives the wireless information WI1 from the terminal apparatus 200, and determines that the authentication of the terminal apparatus 200 has succeeded in a case where the received wireless information WI1 is identical with the wireless information WI1 in the predetermined information 140B. In this case, the CPU 132 establishes a WFD connection with the terminal apparatus 200, and causes the terminal apparatus 200 to participate in the first NW as a child station. S210, which is in the setting process of S126 of FIG. 3, is the same as described above, except for the point that the wireless information WI2 is used. That is, the CPU 132 executes a second type of connection process using the wireless information WI2, establishes a WFD connection with the terminal apparatus 200, and causes the terminal apparatus 200 to participate in the second NW as a child station.

As described above, at the time of S210, the history flag 164 is set in OFF. Therefore, the CPU 132 does not store the wireless information WI1 or WI2 in the history area 152, even if a WFD connection is established by using the wireless information WI1 or WI2.

In S212, the CPU 132 receives the wireless information WIx of the AP 10 from the terminal apparatus 200, not via the AP 10, by using the WFD connection of S210 (i.e., by using the first NW or the second NW). Then, in S214, the CPU 132 stores the wireless information WIx in the setting area 150. Next, in S216, the CPU 132 receives a disconnection request from the terminal apparatus 200 and, as a result, disconnects the WFD connection of S210.

In S220, the CPU 132 attempts to establish a wireless connection with the AP 10 by using the wireless information WIx in the setting area 150. Specifically, the CPU 132 first sends a probe request including the SSID "xxx" in the wireless information WIx. In a case where the AP 10 forming a wireless NW in which the wireless information WIx is used is present in surroundings of the printer 100, the CPU 132 receives a probe response from the AP 10, and then, in the same manner as S210, executes the first type of connection process. However, here, a point that the printer 100 operates as a child station is different from S210 in which the printer 100 operates as G/O (i.e., parent station). During the course of the first type of connection process, the CPU 132 sends the wireless information WIx to the AP 10. Then, in a case where authentication that uses the wireless information WIx in the AP 10 (i.e., authentication of the printer 100) succeeds, the CPU 132 establishes a wireless connection with the AP 10. That is, the CPU 132 causes the printer 100 to participate in as a child station the wireless NW formed by the AP 10 (called "AP NW" below). When S220 ends, the process of FIG. 4 ends.

Although not shown, in a case where the establishment of a wireless connection with the AP 10 succeeds in S220, the CPU 132 can execute a communication with the terminal apparatus 200 or another apparatus by using the AP NW (i.e., via the AP 10). For example, the CPU 132 can receive a print execution request from the terminal apparatus 200 via the AP 10. In this case, the CPU 132 causes the print engine 118 to execute a print process in accordance with the print execution request.

Figure 5:
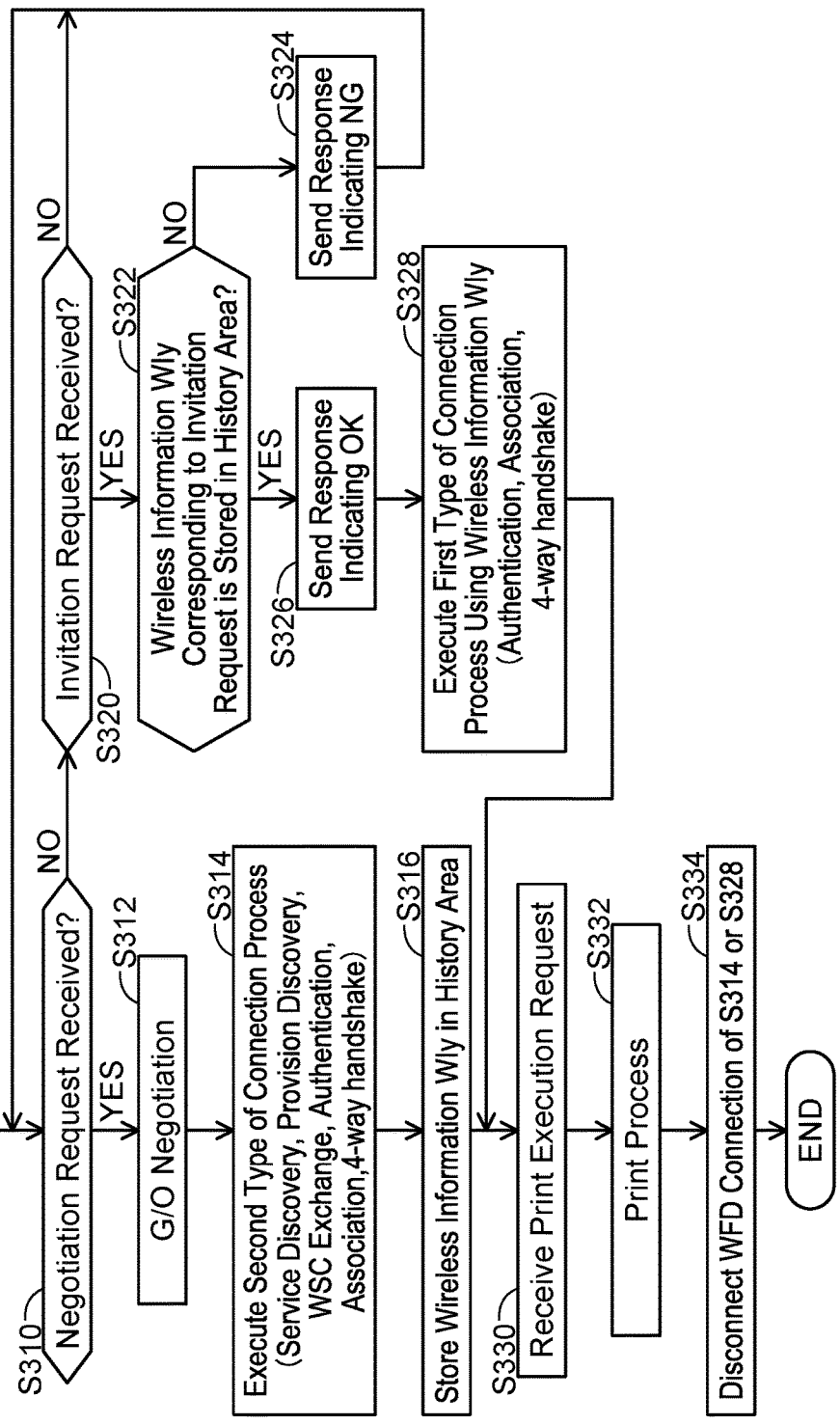
FIG. 5 shows a flowchart of a connection print process.

(Connection Print Process; FIG. 5)

Next, contents of the connection print process executed in S166 of FIG. 3 will be described with reference to FIG. 5. At a stage where the process of FIG. 5 is started, the WFD flag 160 and the history flag 164 are set in ON, and the G/O flag 162 is set in OFF (see S154 of FIG. 3).

In S310, the CPU 132 monitors whether a Negotiation request is received from the terminal apparatus 200. The request is a signal for requesting an execution of G/O Negotiation, and is a signal which is sent to the printer 100 from the terminal apparatus 200 in a case where an aftermentioned WFD connection of S314 has not been established even once between the printer 100 and the terminal apparatus 200. In a case where the request is received, the CPU 132 determines YES in S310, and proceeds to S312.

In S312, the CPU 132 executes a G/O Negotiation with the terminal apparatus 200. Specifically, the CPU 132 sends a signal including a predetermined intent value of the printer 100 (i.e., a value indicating ease of becoming G/O) to the terminal apparatus 200 and further, receives from the terminal apparatus 200 a signal including an intent value of the terminal apparatus 200. Then, in a case where the intent value of the printer 100 is larger than the intent value of the terminal apparatus 200, the CPU 132 determines that the printer 100 is to operate as G/O as well as determines that the terminal apparatus 200 is to operate as CL. Further, in a case where the intent value of the terminal apparatus 200 is larger than the intent value of the printer 100, the CPU 132 determines that the terminal apparatus 200 is to operate as G/O as well as determines that the printer 100 is to operate as CL.

In S314, the CPU 132 executes the second type of connection process for establishing a WFD connection with the terminal apparatus 200. From the view of the G/O apparatus, the second type of connection process includes reception of a Service Discovery request, sending of a response thereto, reception of a Provision Discovery request, sending of a response thereto, communication of a WSC Exchange, and a communication including each signal which is communicated in the first type of connection process of S210 of FIG. 4. That is, the second type of connection process includes a communication including a signal which is not communicated in the first type of connection process (for example Service Discovery request, etc.). Further, the G/O apparatus generates the wireless information WIy, for example, by determining a random character string, and, in the WSC Exchange, sends the wireless information WIy to the CL apparatus. Thereby, both the G/O apparatus and the CL apparatus can use the same wireless information WIy, and a WFD connection is established between the G/O apparatus and the CL apparatus. Thus, in S314, the CPU 132 establishes a WFD connection in which the printer 100 operates as the G/O in the case of determining in S312 that the printer 100 is to operate as the G/O, and establishes a WFD connection in which the printer 100 operates as the CL in the case of determining in S312 that the printer 100 is to operate as the CL.

As described above, in S314, a wireless connection in accordance with the WFD scheme is established. Similarly, in S210 of FIG. 4, also, a wireless connection in accordance with the WFD scheme is established. Thus, in the present embodiment, in S210 of FIG. 4 and S314 of FIG. 5 (further, in after-mentioned S328), a wireless connection in accordance with the same WFD scheme is established. Therefore, the printer 100 and the terminal apparatus 200 may need to support only the WFD scheme, and may not have to support another wireless connection scheme (e.g., the so-called Soft AP scheme). However, in a modification, the printer 100 may establish a wireless connection in accordance with the Soft AP scheme in each of S210 of FIGS. 4 and S314 of FIG. 5. Further, the printer 100 may establish a wireless connection in accordance with the WFD scheme in either one of S210 of FIGS. 4 and S314 of FIG. 5, and establish a wireless connection in accordance with the Soft AP scheme in another one.

At the time of S314, the history flag 164 is set in ON (see the time of starting the process of FIG. 5). Therefore, in S316, the CPU 132 stores the wireless information WIy in the history area 152. The CPU 132 further stores the MACte of the terminal apparatus 200 and the operation information indicating whether the printer 100 operates as the G/O or operates as the CL in the history area 152 in association with the wireless information WIy. The MACte is included in each of the signals received from the terminal apparatus 200 (e.g., the probe request of S160 of FIG. 3, the signals of S314 of FIG. 5, etc.). When S316 ends, the process proceeds to S330.

Simultaneously with the monitoring of S310, in S320, the CPU 132 monitors whether an Invitation request is received from the terminal apparatus 200. The request is a signal for requesting re-establishment of the WFD connection, and is a signal which is sent to the printer 100 from the terminal apparatus 200 in either of a case where the WFD connection of S314 was established in the past, and a case where WFD connection of S314 has not been established even once. In a case where the request is received, the CPU 132 determines YES in S320, and proceeds to S322.

In S322, the CPU 132 determines whether or not the wireless information WIy corresponding to the request of S320 is being stored in the history area 152. Specifically, in a case where the wireless information WIy is being stored in the history area 152 in association with the MACte included in the request of S320, the CPU 132 determines YES in S322, and proceeds to S326. On the other hand, in a case where the wireless information WIy is not stored in the history area 152 in association with the MACte included in the request of S320, the CPU 132 determines NO in S322, and proceeds to S324. In S324, the CPU 132 sends an Invitation response indicating that the CPU 132 cannot re-establish the WFD connection (i.e., NG) to the terminal apparatus 200. In this case, the process returns to S310.

In S326, the CPU 132 sends an Invitation response indicating that the CPU 132 cannot re-establish the WFD connection (i.e., OK) to the terminal apparatus 200. Then, in S328, the CPU 132 executes the first type of connection process for establishing a WFD connection with the terminal apparatus 200 by using the operation information and the wireless information WIy in the history area 152. The signals communicated in the first type of connection process are the same as those of S210 of FIG. 4. The CPU 132 re-establishes the WFD connection in which the printer 100 operates as the G/O in a case where the operation information indicates G/O, and re-establishes the WFD connection in which the printer 100 operates as the CL in a case where the operation information indicates CL. When S328 ends, the process proceeds to S330.

In S330, the CPU 132 receives a print execution request from the terminal apparatus 200, not via the AP 10, by using the WFD connection of S314 or S328 (i.e., by using the first NW or the second NW). The print execution request is a command for requesting the printer 100 to execute the print process, and includes print data representing a target image of a print target. In S332, the CPU 132 provides the print data to the print engine 118, and causes the print engine 118 to execute a print of the target image.

Next, in S334, the CPU 132 disconnects the WFD connection of S314 or S328. In the case where the printer 100 is the G/O apparatus, the CPU 132 receives a disconnection request from the terminal apparatus 200 and, as a result, disconnects the WFD connection. Further, in the case where the printer 100 is the CL apparatus, the CPU 132 sends a disconnection request to the terminal apparatus 200 and, as a result, disconnects the WFD connection. When S334 ends, the process of FIG. 5 ends.

Figure 6:
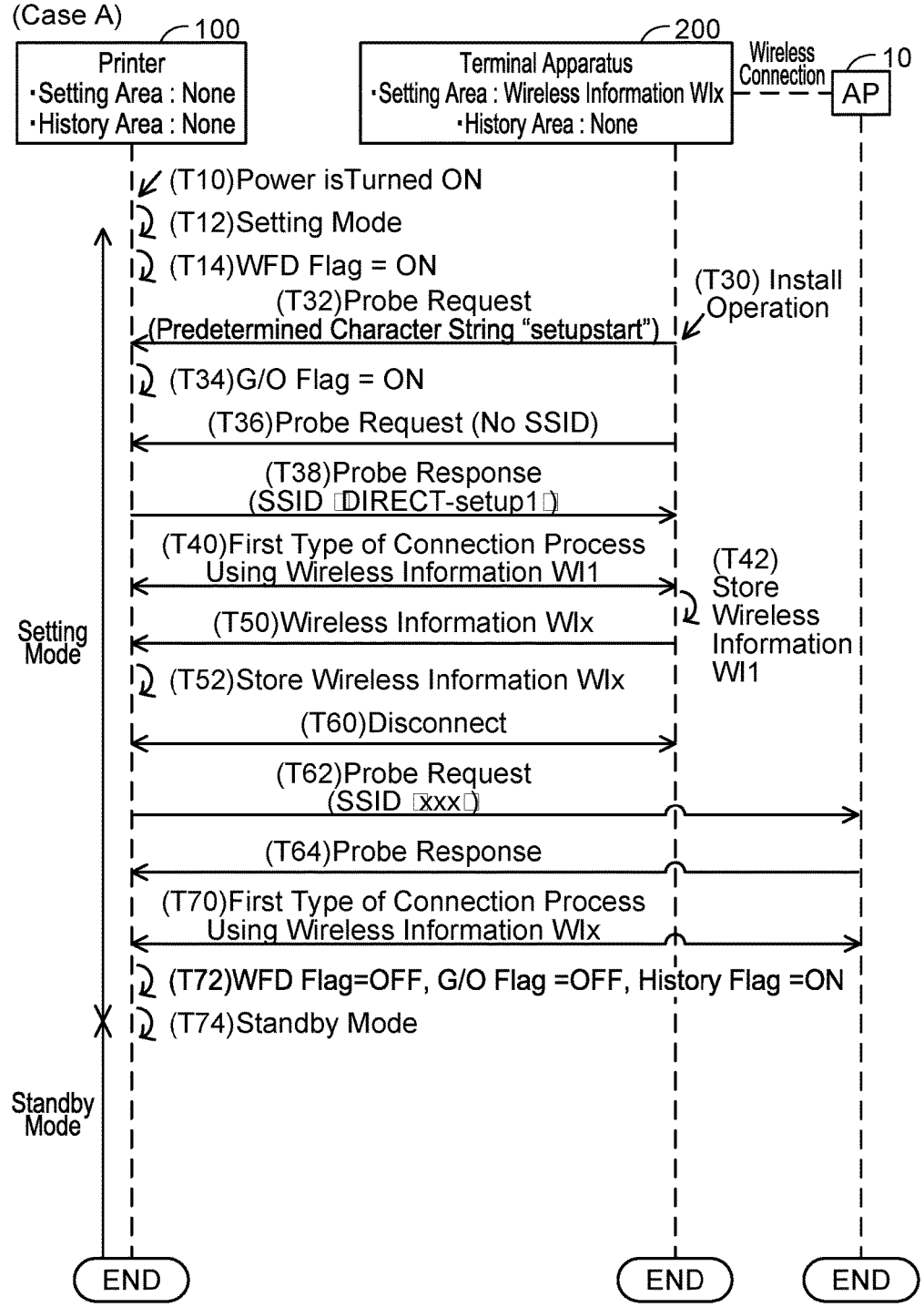

(Case A; FIG. 6)

Next, specific cases implemented by the processes of FIG. 2 to FIG. 5 will be described with reference to FIG. 6 to FIG. 9. First, a case A in which the wireless information WIx of the AP 10 is set in the printer 100 when the power is initially turned ON will be described with reference to FIG. 6. In an initial state of FIG. 6, the printer 100 has not been turned on yet since shipped. Wireless information has not been stored yet in the setting area 150 and the history area 152. Further, the terminal apparatus 200 has established a wireless connection with the AP 10. Therefore, the wireless information WIx is being stored in the setting area 250. On the other hand, wireless information has not been stored yet in the history area 252.

In T10, the power of the printer 100 is turned on (the trigger of the process of FIG. 2). In this case, in T12, the printer 100 operates in the setting mode (S12) and, in T14, changes the WFD flag 160 to ON (S14).

In T30, the terminal apparatus 200 accepts an install operation for installing the communication program 242A and the predetermined information 242B in the terminal apparatus 200. In this case, the terminal apparatus 200 installs and starts the communication program 242A, and executes each of the following processes in accordance with the communication program 242A. In T32, the terminal apparatus 200 broadcasts the predetermined probe request including the predetermined character string "setupstart" in the predetermined information 242B.

Upon receiving the request of T32 (YES in S20), in T34, the printer 100 changes the G/O flag 162 to ON (i.e., operates autonomously as the G/O), and forms the first NW in which the wireless information WI1 is used (S24).

In T36, the terminal apparatus 200 broadcasts a probe request not including an SSID.

Upon receiving the request of T36 (YES in S30), in T38, the printer 100 sends a probe response including the SSID "DIRECT-setup1" in the wireless information WI1 to the terminal apparatus 200 (S34). Then, in T40, the printer 100 executes the first type of connection process using the wireless information WI1, and establishes a WFD connection with the terminal apparatus 200 (S210 of FIG. 4). Thereby, a state is constructed in which both the printer 100 and the terminal apparatus 200 belong to the first NW. Since the history flag 164 is set in OFF, the printer 100 does not store the wireless information WI1 in the history area 152.

Upon receiving the response of T38, the terminal apparatus 200 determines that the wireless information WI1 including the SSID "DIRECT-setup1" in the response is being stored (see the communication program 242A) and, in T40, the terminal apparatus 200 executes the first type of connection process using the wireless information WI1, and establishes a WFD connection with the printer 100. In the terminal apparatus 200, the Persistent function is usually enabled. Therefore, in T42, the terminal apparatus 200 stores the wireless information WI1 in association with the MACpr of the printer 100 in the history area 252. Next, in T50, the terminal apparatus 200 sends the wireless information WIx in the setting area 250 to the printer 100 by using the WFD connection of T40.

Upon receiving the wireless information WIx of T50 (S212), in T52, the printer 100 stores the wireless information WIx in the setting area 150 (S214). Next, in T60, the printer 100 disconnects the WFD connection of T40 (S216), in T62, the printer 100 broadcasts a probe request including the SSID "xxx" included in the wireless information WIx in the setting area 150 (S220), and in T64, receives a probe response from the AP 10 (S220). Then, in T70, the printer 100 executes the first type of connection process using the wireless information WIx, and establishes a wireless connection with the AP 10 (S220). Thereby, a state is constructed in which both the printer 100 and the terminal apparatus 200 belong to the AP NW.

Next, in T72, the printer 100 changes the WFD flag 160 and the G/O flag 162 to OFF as well as changes the history flag 164 to ON (S40 of FIG. 2) and, in T74, the printer 100 operates in the standby mode (S42).

As described above, since the printer 100 operates in the setting mode when the power is initially turned ON (T12), once the communication program 242A is installed in the terminal apparatus 200 accompanied by initially turning ON the power of the printer 100 (T30), the printer 100 establishes a WFD connection with the terminal apparatus 200 (T40), and can receive the wireless information WIx from the terminal apparatus 200 (T50). Therefore, the printer 100 can participate in the AP NW by using the wireless information WIx (T70). It is sufficient for the user to install the communication program 242A in the terminal apparatus 200, and the user may not have to implement another operation for causing the printer 100 to participate in the AP NW (e.g., an operation of entering the wireless information WIx directly to the printer 100). Therefore, it is possible to improve convenience for the user. Then, although not shown, the printer 100 can execute communication with each of apparatuses which are participating in the AP NW (e.g., the terminal apparatus 200).

Figure 7:
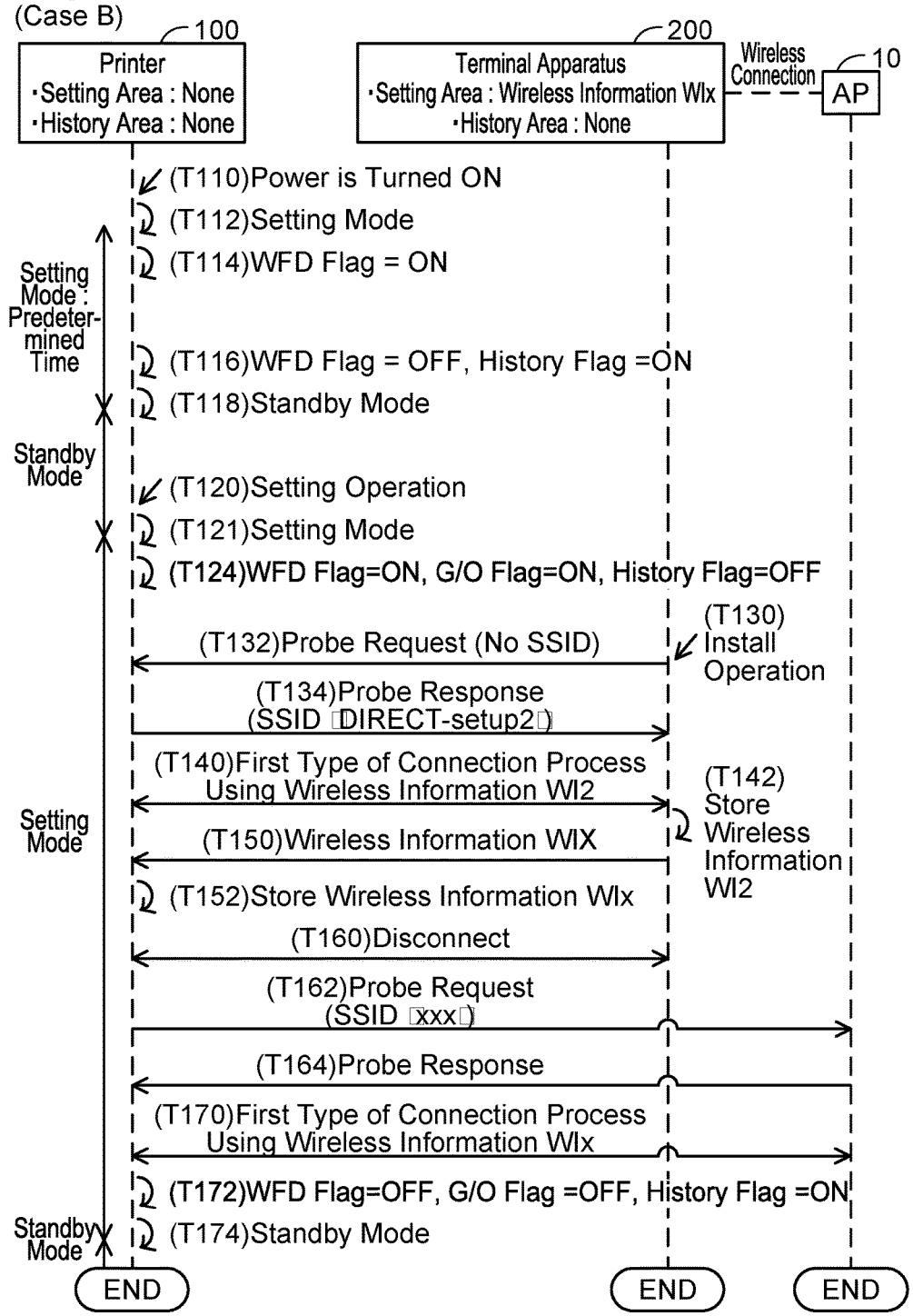
FIG. 7 shows a sequence diagram of a case B at a time of a setting operation.

(Case B; FIG. 7)

Next, a case B in which the wireless information WIx of the AP 10 is set in the printer 100 at the time of the setting operation will be described with reference to FIG. 7. An initial state of FIG. 7 is the same as the initial state of FIG. 6.

T110 to T114 are the same as T10 to T14 of FIG. 6. In the present case, since the communication program 242A is not installed in the terminal apparatus 200 accompanied by initially turning ON the power of the printer 100, the printer 100 does not receive a probe request including the predetermined character string "setupstart" from the terminal apparatus 200 until a predetermined period of time has lapsed since initially turning ON (YES in S22 of FIG. 2). Therefore, in T116, the printer 100 changes the WFD flag 160 to OFF as well as changes the history flag 164 to ON (S40) and, in T118, operates in the standby mode (S42).

Then, in T120, the printer 100 accepts the setting operation (YES in S110 of FIG. 3). In this case, in T122, the printer 100 operates in the setting mode (S112) and, in T124, changes the WFD flag 160 and the G/O flag 162 to ON (i.e., operates as the G/O), and forms the second NW in which the wireless information WI2 is used (S114). Here, the printer 100 further changes the history flag 164 to OFF (S114).

In T130, the terminal apparatus 200 accepts the install operation. In this case, the terminal apparatus 200 installs and starts the communication program 242A, and executes each of the following processes in accordance with the communication program 242A. Although not shown, the terminal apparatus 200 broadcasts the predetermined probe request including the predetermined character string, in the same manner as T32 of FIG. 6. However, since the printer 100 is already operating as the G/O, the printer 100 does not execute a process in accordance with the predetermined probe request. Then, in T132, the terminal apparatus 200 broadcasts a probe request not including an SSID.

Upon receiving the request of T132 (YES in S120), in T134, the printer 100 sends a probe response including the SSID "DIRECT-setup2" in the wireless information WI2 to the terminal apparatus 200 (S124). T140 to T160, which follow, are the same as T40 to T60 of FIG. 6, except for the wireless information WI2 being used. Here, also, since the history flag 164 is set in OFF, the printer 100 does not store the wireless information WI2 in the history area 152. Further, T162 to T174 are the same as T62 to T74 of FIG. 6.

As described above, since the printer 100 operates in the setting mode (T122) at the time of the setting operation, once the communication program 242A is installed in the terminal apparatus 200 (T130) accompanied by the setting operation, the printer 100 establishes a WFD connection with the terminal apparatus 200 (T140), and can receive the wireless information WIx from the terminal apparatus 200 (T150). Therefore, the same effects as case A can be obtained.

Figure 8:
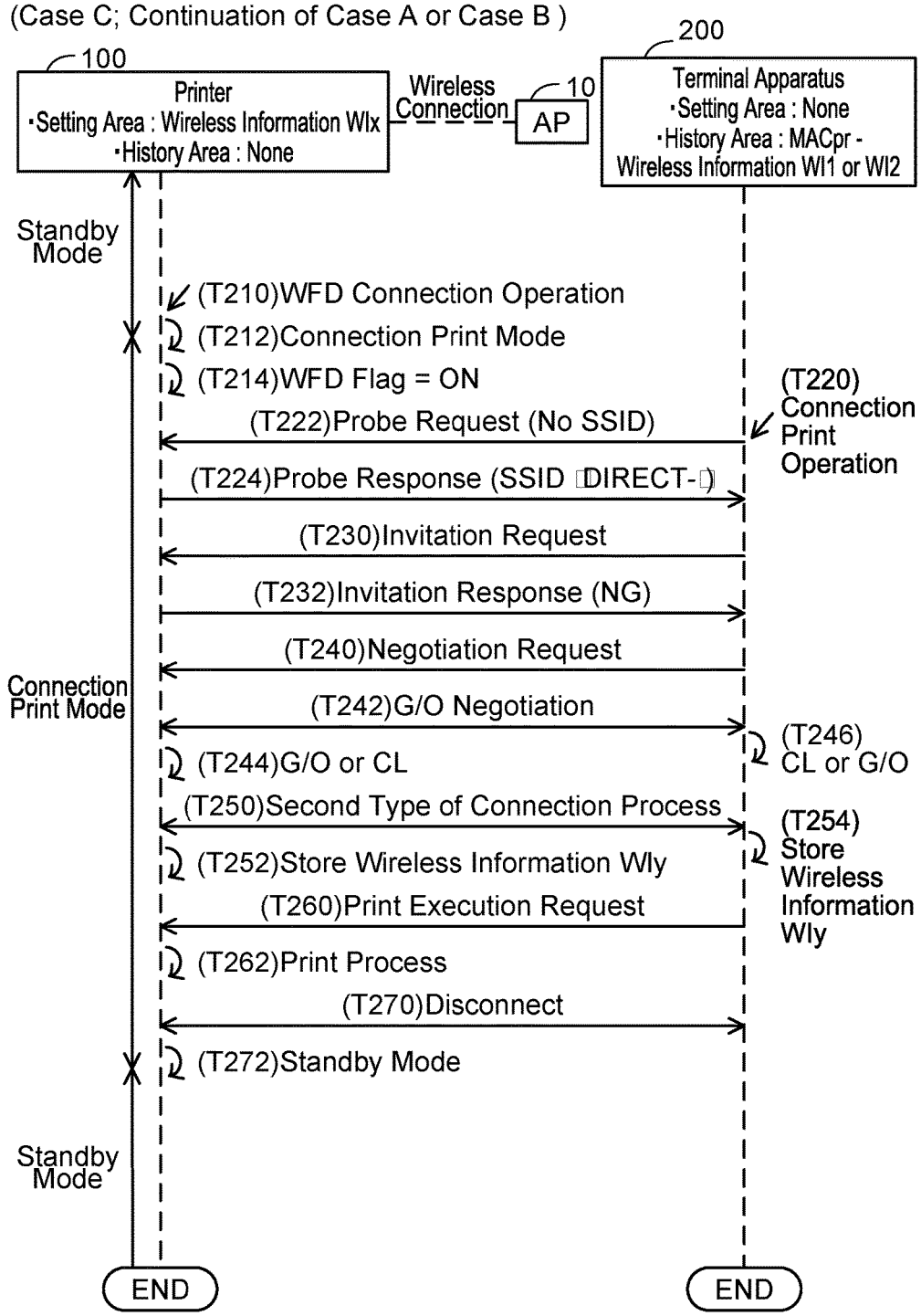
FIG. 8 shows a sequence diagram of a case C in which printing is executed after establishment of a wireless connection.

(Case C; FIG. 8)

Next, a case C, which is a continuation of case A or B (see FIG. 6, FIG. 7), will be described with reference to FIG. 8.

In an initial state of case C, the printer 100 belongs to the AP NW (see T70 of FIG. 6, T170 of FIG. 7). Consequently, the wireless information WIx is being stored in the setting area 150 (see T52 of FIG. 6, T152 of FIG. 7). Further, wireless information has not yet been stored in the history area 152. In addition, since the wireless connection with the AP 10 was disconnected after case A or B ended, the terminal apparatus 200 is in a state where the wireless connection with the AP 10 is disconnected. Consequently, the wireless information WIx is not stored in the setting area 250. Further, the wireless information WI1 or WI2 is being stored in association with the MACpr in the history area 252 (see T42 of FIG. 6, T142 of FIG. 7).

In T210, the printer 100 accepts the WFD connection operation under a state of operating in the standby mode (YES in S150 of FIG. 3). In this case, in T212, the printer 100 operates in the connection print mode (S152) and, in T214, changes the WFD flag 160 to ON (S154). Here, the G/O flag 162 is maintained in OFF and the history flag 164 is maintained in ON.

In T220, the terminal apparatus 200 accepts the connection print operation. When the communication program 242A is installed in the terminal apparatus 200 (see T30 of FIG. 6, T130 of FIG. 7), the driver program 244 is also installed. The connection print operation includes a designation operation of an image file representing a target image of a print target, and a print start operation according to the driver program 244. Upon accepting the connection print operation, in T222, the terminal apparatus 200 broadcasts a probe request not including an SSID.

Upon receiving the request of T222 (YES in S160), in T224, the printer 100 sends a probe response including the SSID "DIRECT-" to the terminal apparatus 200 (S164).

Upon receiving the response of T224, the terminal apparatus 200 determines that the wireless information WI1 or WI2 is being stored in the history area 252 in association with the MACpr of the printer 100 in the response. In this case, in T230, the terminal apparatus 200 sends an Invitation request to the printer 100.

Upon receiving the request of T230 (YES in S320 of FIG. 5), the printer 100 determines that wireless information is not being stored in the history area 152 in association with the MACte of the terminal apparatus 200 in the request (NO in S322). Therefore, in T232, the printer 100 sends an Invitation response indicating NG to the terminal apparatus 200 (S324).

Upon receiving the response of T232, the terminal apparatus 200 determines that a WFD connection using the wireless information WI1 or WI2 in the history area 252 cannot be established and, in T240, sends a Negotiation request to the printer 100.

Upon receiving the request of T240 (YES in S310 of FIG. 5), in T242, the printer 100 executes a G/O Negotiation with the terminal apparatus 200 (S312). As a result, in T244, the printer 100 determines that the printer 100 is to operate as the G/O or the CL and, in T246, the terminal apparatus 200 determines that the terminal apparatus 200 is to operate as the CL or the G/O.

Next, in T250, the printer 100 executes the second type of connection process using the wireless information WIy determined by the G/O apparatus, and establishes a WFD connection with the terminal apparatus 200 (S314). In this case, in T252, since the history flag 164 is set in ON, the printer 100 stores the wireless information WIy in the history area 152 in association with the MACte of the terminal apparatus 200 and the operation information (S316).

Further, in T250, the terminal apparatus 200 executes the second type of connection process using the wireless information WIy, and establishes a WFD connection with the printer 100. In this case, in T254, the terminal apparatus 200 stores the wireless information WIy in the history area 252 instead of the wireless information WI1 or WI2 in the history area 252. Next, the terminal apparatus 200 converts the image file designated in T220 to generate print data that can be interpreted by the print engine 118. Then, in T260, the terminal apparatus 200 sends a print execution request including the generated print data to the printer 100.

Upon receiving the request of T260 (S330), in T262, the printer 100 executes a print process in accordance with the print data in the request (S332). Next, in T270, the printer 100 disconnects the WFD connection (S334) and, in T272, operates in the standby mode (S170 of FIG. 3).

As described above, in the initial state of case C, the printer 100 is participating in the AP NW, but the terminal apparatus 200 is not participating in the AP NW. Therefore, the printer 100 cannot receive a print execution request from the terminal apparatus 200 by using the AP NW. However, as shown in case C, since the printer 100 operates in the connection print mode at the time of the WFD connection operation (T212), once the connection print operation, which is executed together with the WFD connection operation, is executed in the terminal apparatus 200 (T220), the printer 100 can establish a WFD connection with the terminal apparatus 200 (T250), and receive the print execution request from the terminal apparatus 200 (T260). Therefore, the printer 100 can properly execute the print process (T262).

(Case D; FIG. 9)

Next, a case D, which is a continuation of case C (see FIG. 8), will be described with reference to FIG. 9. In an initial state of case D, in the printer 100, the wireless information WIx is being stored in the setting area 150 (see T52 of FIG. 6, T152 of FIG. 7), and the wireless information WIy is being stored in the history area 152 in association with the MACte (see T252 of FIG. 8). Further, in the terminal apparatus 200, the wireless information WIx is not being stored in the setting area 250, and the wireless information WIy is being stored in the history area 252 in association with the MACpr (see T254 of FIG. 8).

T310 and T312 are the same as T210 and T212 of FIG. 8. Since the printer 100 has been maintaining the WFD flag 160 in ON after turning the WFD flag 160 ON in T214 of FIG. 8, the printer 100 does not change the WFD flag 160 after T312 (i.e., S154 of FIG. 3 is not executed).

T320 to T330 are the same as T220 to T230 of FIG. 8. Upon receiving the request of T330 (YES in S320 of FIG. 5), the printer 100 determines that the wireless information WIy is being stored in the history area 152 in association with the MACte of the terminal apparatus 200 in the request (YES in S322). Therefore, in T332, the printer 100 sends an Invitation response indicating OK to the terminal apparatus 200 (S326). Next, in T350, the printer 100 executes the first type of connection process using the wireless information WIy in the history area 152, and re-establishes the WFD connection in which the printer 100 operates as the G/O or the CL indicated by the operation information in the history area 152 (S328). S360 to S372 are the same as S260 to S272 of FIG. 8.

As described above, in case D, since the wireless information WIy is stored in the history area 152, the printer 100 can re-establish the WFD connection with the terminal apparatus 200 by using the wireless information WIy (T350). At this occasion time, the G/O Negotiation of T242 of FIG. 8 is not executed, and the communication of each signal such as the Service Discovery request, Provision Discovery request, and WSC Exchange, etc. of T250 is not executed. Therefore, the printer 100 can re-establish the WFD connection with a communication data amount lesser than that of case C of FIG. 8, that is, with a lower processing load than that of case C. Further, the printer 100 can re-establish the WFD connection faster than case C.

(Effect of the Present Embodiment)

After describing a comparative example with reference to FIG. 10, effect of the present embodiment will be described. In a printer 300 of the comparative example, the Persistent function is enabled when the power is initially turned ON or at a time of a setting operation. Consequently, in a case of establishing a WFD connection with the terminal apparatus 200 when the power is initially turned ON or at the time of the setting operation (see T40 of FIG. 6, T140 of FIG. 7), the printer 300 stores the wireless information WI1 or WI2 in association with the MACte of the terminal apparatus 200 in an history area (an area corresponding to the reference number 152 of FIG. 1). The printer 300 has already received the wireless information WIx of the AP 10 from the terminal apparatus 200 by using the WFD connection (see T50 of FIG. 6, T150 of FIG. 7), and is participating in the AP NW (see T70 of FIG. 6, T170 of FIG. 7). The initial state of the terminal apparatus 200 is the same as case C of FIG. 8.

T410 to T430 are the same as T210 to T230 of FIG. 8. Upon receiving the request of T430, the printer 300 determines that the wireless information WI1 or WI2 is being stored in the history area in association with the MACte of the terminal apparatus 200 in the request. Therefore, in T432, the printer 300 sends an Invitation response indicating OK to the terminal apparatus 200. Next, in T450, the printer 300 executes the first type of connection process using the wireless information WI1 or WI2 in the history area and re-establishes the WFD connection with the terminal apparatus 200.

Since the WFD connection using the wireless information WI1 or WI2 for the setting mode is established (T450) in spite of a situation where the printer 300 should operate in the connection print mode, in T452, the printer 300 shifts from the connection print mode to the setting mode. In this case, due to operating in the setting mode, in S460, the printer 300 cannot execute the print process even if receiving a print execution request from the terminal apparatus 200. Thus, in case of implementing a configuration of the comparative example in which the wireless information WI1 or WI2 is stored in the history area in a case where a WFD connection is established under a state where the printer 300 is operating in the setting mode, there is a possibility that the printer 300 cannot operate properly in accordance with the connection print mode.

By contrast, the printer 100 of the present embodiment, when the power is initially turned ON or at the time of the setting operation, sets the history flag 164 to OFF to disable the Persistent function (the history flag 164 is not turned ON in T14 of FIG. 6, or the history flag 164 is turned OFF in T124 of FIG. 7). Consequently, in a case where a WFD connection is established under a state where the printer 100 is operating in the setting mode (T40 of FIG. 6, T140 of FIG. 7), the printer 100 does not store the wireless information WI1 or WI2 in the history area 152. Consequently, the printer 100 can properly suppress a phenomenon in which the WFD connection is re-established by using the wireless information WI1 or WI2 in the history area 152 in spite of a situation where the printer 100 should establish a WED connection while operating in the connection print mode (i.e., T212 of case C), that is, the phenomenon of T450 of FIG. 10. Therefore, since the printer 100 can properly establish a WFD connection by using the wireless information WIy that is different from the wireless information WI1 or WI2 used in the setting mode (T250) under a state where the printer 100 is operating in the connection print mode, the printer 100 can properly execute the print process in accordance with the connection print mode (T262).

Further, a capacity of the history area 152 is predetermined. In case of implementing the configuration in which the wireless information WI1 or WI2 is stored in the history area 152, the remaining capacity of the history area 152 becomes less. In the present embodiment, since neither the wireless information WI1 nor WI2 is stored in the history area 152, it is possible to suppress a reduction of the remaining capacity of the history area 152, and appropriately store wireless information that is to be stored in the history area 152.

(Correspondence Relationships)

The setting mode and the connection print mode are examples of "first operation mode" and "second operation mode," respectively. The wireless information WI1 or WI2 is an example of "first wireless information." The wireless information WIy and the wireless information WIx are examples of "second wireless information" and "third wireless information," respectively. The WFD connection of T40 of FIG. 6 or T140 of FIG. 7 is an example of "first wireless connection." The WFD connections of T250 of FIG. 8 and T350 of FIG. 9 are examples of "second wireless connection." The wireless connection of T70 of FIG. 6 or T170 of FIG. 7 is an example of "third wireless connection." The setting operation of S110 of FIG. 3 and the WFD connection operation of S150 are examples of "first instruction" and "second instruction," respectively. The communication of signals in the first type of connection process of S210 of FIGS. 4 and S328 of FIG. 5, the communication of signals in the second type of connection process of S314, the G/O Negotiation of S312, and the Invitation request of S320 are examples of "first type of communication," "second type of communication," "determination communication," and "re-establishment request," respectively. The print engine 118 and the print execution request are examples of "image processing engine" and "execution request," respectively. The WFD scheme is an example of "predetermined wireless connection scheme."

(Modification 1)

The "communication apparatus" is not restricted to the printer 100 and may be a scanner capable of executing a scan function. In this case, a scan engine is used instead of the print engine 118. Further, S152 and S166 of FIG. 3 become a connection scan mode and connection scan process, a scan execution request is received in S330 of FIG. 5 and, a scan process for causing the scan engine to execute a scan is executed in S332. Then, scan data is sent to the terminal apparatus 200 by using the WFD connection of S314 or S328. In the present modification, the connection scan mode, the scan engine, and the scan execution request are examples of "second operation mode," "image processing engine," and "execution request," respectively. In another modification, the "communication apparatus" may be an apparatus which executes a function (e.g., display function, calculation function) different from the print function and scan function (e.g., PC, server, portable terminal (mobile phone, smartphone, PDA, etc.)). In this case, "image processing engine" can be omitted.

(Modification 2)

In S110 of FIG. 3, the CPU 132 may determine YES in S110, for example, in a case where a near field wireless communication (NFC (abbreviation of Near Field Communication) communication, a Blue Tooth (registered trademark) communication, etc.) is executed, and a signal indicating the start of operation of the setting mode is received from the terminal apparatus 200. In the present modification, the signal is an example of "first instruction." Similarly, "second instruction" may be a signal received by a near field wireless communication.

(Modification 3)

The "setting information" is not restricted to the wireless information WIx of the AP 10 and, for example, may be information indicating a default print setting, or may be information indicating a telephone book stored in the terminal apparatus 200. In the present modification, "setting information" does not include "third wireless information," and "establishing a third wireless connection with the access point via the wireless interface" can be omitted. Generally speaking, "setting information" may be any information to be used (i.e., set) by the communication apparatus.

(Modification 4)

When the power of the printer 100 is initially turned ON, the CPU 132 may not execute the process of FIG. 2. In another modification, the CPU 132 may not execute S110 to S132 of FIG. 3 at the time of the setting operation. Further, in another modification, the CPU 132 may not execute the processes of S150 to S170 of FIG. 3 at the time of the WFD connection operation. For example, the CPU 132 may regularly operate in the print execution mode.

(Modification 5)

In S210 of FIG. 4, the CPU 132 may execute the G/O Negotiation and further, execute the second type of connection process. That is, in "establishing a first wireless connection," "establishing a second wireless connection," and "re-establishing the second wireless connection", a wireless connection may be established by executing communication of the same type of signals.

(Modification 6)

In S310 and S312 of FIG. 5, the CPU 132 may, for example, cause the printer 100 to operate autonomously as the G/O without executing the G/O Negotiation (or the terminal apparatus 200 may operate autonomously as the G/O). That is, "establishing a second wireless connection" may not include "determination communication."

(Modification 7)

In S316 of FIG. 5, the CPU 132 may not store the operation information in the history area 152. In this case, in S328, the CPU 132 may execute a G/O Negotiation, and establish a WFD connection in response to the result thereof.

(Modification 8)

In the above embodiment, the CPU 132 receives an Invitation request from the terminal apparatus 200 (YES in S320 of FIG. 5), and re-establishes the WFD connection (S328). Instead, the CPU 132 may send an Invitation request to the terminal apparatus 200, and re-establish the WFD connection. That is, "re-establishing the second wireless connection" may be performed without receiving a re-establishment request.

(Modification 9)

In each of the above embodiments, each of processes of FIG. 2 to FIG. 9 is implemented by software (i.e., the programs 140A, 240A, 244). However, at least one of the processes of FIG. 2 to FIG. 9 may be implemented by hardware such as a logic circuit.

What is claimed is:

1. A communication apparatus comprising:
a wireless interface;
a processor; and
a memory comprising a setting area for storing setting information which is to be used by the communication apparatus and a connection history area for storing wireless information for establishing a wireless connection in a case where the wireless connection via the wireless interface is established,
wherein the memory stores computer-readable instructions therein, and the computer-readable instructions, when executed by the processor, cause the communication apparatus to execute:
causing the communication apparatus to operate in one of a plurality of operation modes including a first operation mode and a second operation mode different from the first operation mode, the first operation mode being for receiving the setting information which is to be used by the communication apparatus from a terminal apparatus so as to store the setting information in the setting area;
establishing a first wireless connection with the terminal apparatus via the wireless interface by using first wireless information under a state where the communication apparatus operates in the first operation mode;
receiving the setting information by using the first wireless connection so as to store the setting information in the setting area, in a case where the first wireless connection is established;
establishing a second wireless connection with the terminal apparatus via the wireless interface by using second wireless information different from the first wireless information under a state where the communication apparatus operates in the second operation mode;
storing the second wireless information in the connection history area in a case where the second wireless connection is established, wherein the first wireless information is not stored in the connection history area even when the first wireless connection is established; and
re-establishing the second wireless connection with the terminal apparatus by using the second wireless information stored in the connection history area in a case where a wireless connection with the terminal apparatus via the wireless interface is to be re-established under a state where the communication apparatus operates in the second operation mode after the second wireless connection has been disconnected.

2. The communication apparatus as in claim 1, wherein the setting information includes third wireless information being used in a wireless network formed by an access point, and
the computer-readable instructions, when executed by the processor, causing the communication apparatus to further execute:
establishing a third wireless connection with the access point via the wireless interface by using the third wireless information included in the setting information in a case where the setting information is received from the terminal apparatus.

3. The communication apparatus as in claim 1, wherein the communication apparatus is caused to operate in the first operation mode until a predetermined period of time has lapsed since the communication apparatus was turned on.

4. The communication apparatus as in claim 1, wherein the communication apparatus is caused to operate in the first operation mode in a case where a first instruction for causing the communication apparatus to operate in the first operation mode is given under a state where the communication apparatus does not operate in the first operation mode.

5. The communication apparatus as in claim 1, wherein the communication apparatus is caused to operate in the second operation mode in a case where a second instruction for causing the communication apparatus to operate in the second operation mode is given under a state where the communication apparatus does not operate in the second operation mode.

6. The communication apparatus as in claim 1, wherein the first wireless connection is established with the terminal apparatus by executing a first type of communication using the first wireless information via the wireless interface,
the second wireless connection is established with the terminal apparatus by executing a second type of communication using the second wireless information, the second type of communication including a communication of a signal which is not communicated in the first type of communication, and
the second wireless connection is re-established with the terminal apparatus by executing the first type of communication using the second wireless information via the wireless interface.

7. The communication apparatus as in claim 1, wherein the establishing of the second wireless connection includes executing a determination communication with the terminal apparatus via the wireless interface, the determination communication being for determining which of the communication apparatus and the terminal apparatus is to operate as a parent station,
in a case where it is determined as a result of the determination communication that the communication apparatus is to operate as the parent station, the second wireless connection in which the communication apparatus operates as the parent station is established with the terminal apparatus, and
in a case where it is determined as a result of the determination communication that the terminal apparatus is to operate as the parent station, the second wireless connection in which the communication apparatus operates as a child station is established with the terminal apparatus.

8. The communication apparatus as in claim 1, wherein the second wireless information is stored in the connection history area in association with operation information in a case where the second wireless connection is established, the operation information indicating as which of a parent station or a child station the communication apparatus is to operate in the second wireless connection, and
the second wireless connection in which the communication apparatus is to operate as a station indicated by the operation information is re-established by using the second wireless information and the operation information that are stored in the connection history area.

9. The communication apparatus as in claim 1, wherein the second wireless connection is re-established with the terminal apparatus in a case where a re-establishment request for re-establishing the second wireless connection is received from the terminal apparatus via the wireless interface under a state where the communication apparatus operates in the second operation mode after the second wireless connection has been disconnected.

10. The communication apparatus as in claim 1, wherein the second operation mode is for executing an image processing in response to an execution request of the image processing that is received from the terminal apparatus,
the communication apparatus further comprises an image processing engine, and
the computer-readable instructions, when executed by the processor, cause the communication apparatus to further execute:
receiving the execution request from the terminal apparatus by using the second wireless connection in a case where the second wireless connection is established; and
causing the image processing engine to execute the image processing in response to the execution request.

11. The communication apparatus as in claim 1, wherein the first wireless information has been stored in the memory in advance before the communication apparatus started to operate in the first operation mode, and
the second wireless information is stored in the memory after the communication apparatus has started to operate in the second operation mode.

12. The communication apparatus as in claim 1, wherein the first wireless connection is in accordance with a predetermined wireless connection scheme, and
the second wireless connection is in accordance with the predetermined wireless connection scheme.

13. The communication apparatus as in claim 1, wherein the first wireless information includes a first SSID (abbreviation of Service Set Identifier) and a first password, and
the second wireless information includes a second SSID different from the first SSID and a second password different from the first password.

14. A non-transitory computer-readable recording medium storing computer-readable instructions for a communication apparatus,
wherein the computer-readable instructions, when executed by a processor of the communication apparatus, causing the communication apparatus to execute:
causing the communication apparatus to operate in one of a plurality of operation modes including a first operation mode and a second operation mode different from the first operation mode, the first operation mode being for receiving setting information which is to be used by the communication apparatus from a terminal apparatus so as to store the setting information in a setting area in a memory of the communication apparatus;
establishing a first wireless connection with the terminal apparatus via a wireless interface of the communication apparatus by using first wireless information under a state where the communication apparatus operates in the first operation mode;
receiving the setting information by using the first wireless connection so as to store the setting information in the setting area, in a case where the first wireless connection is established;

establishing a second wireless connection with the terminal apparatus via the wireless interface by using second wireless information different from the first wireless information under a state where the communication apparatus operates in the second operation mode;

storing the second wireless information in a connection history area in the memory in a case where the second wireless connection is established, wherein the first wireless information is not stored in the connection history area even when the first wireless connection is established; and re-establishing the second wireless connection with the terminal apparatus by using the second wireless information stored in the connection history area in a case where a wireless connection with the terminal apparatus via the wireless interface is to be re-established under a state where the communication apparatus operates in the second operation mode after the second wireless connection has been disconnected.

* * * * *